United States Patent
Perrier et al.

(10) Patent No.: US 10,011,363 B2
(45) Date of Patent: Jul. 3, 2018

(54) ANTI-ICING / DE-ICING SYSTEM FOR AIRCRAFT DOOR AND AIRCRAFT DOOR EQUIPPED WITH SUCH A SYSTEM

(71) Applicants: LATECOERE, Toulouse (FR); JPR, Paris (FR)

(72) Inventors: Christophe Perrier, Toulouse (FR); Cyrille Bessettes, Buzet sur Tarn (FR); Bernard Amalric, L'Union (FR); Bertrand Florentz, Levallois Perret (FR); Antoine Torris, Villiers Bretonneux (FR); Olivier Come, Saint Jean de Brave (FR)

(73) Assignees: Latecoere, Toulouse (FR); JPR, Paris (FR)

( * ) Notice: Subject to any disclaimer, the term of this patent is extended or adjusted under 35 U.S.C. 154(b) by 385 days.

(21) Appl. No.: 14/897,426

(22) PCT Filed: Jun. 14, 2014

(86) PCT No.: PCT/EP2014/062486
§ 371 (c)(1),
(2) Date: Dec. 10, 2015

(87) PCT Pub. No.: WO2014/198956
PCT Pub. Date: Dec. 18, 2014

(65) Prior Publication Data
US 2016/0114895 A1     Apr. 28, 2016

(30) Foreign Application Priority Data
Jun. 14, 2013   (FR) ...................................... 13 55589

(51) Int. Cl.
*B64D 15/12*     (2006.01)
*B64C 1/14*      (2006.01)
(Continued)

(52) U.S. Cl.
CPC ............ *B64D 15/12* (2013.01); *B64C 1/1407* (2013.01); *B64D 15/04* (2013.01); *F16J 15/064* (2013.01)

(58) Field of Classification Search
CPC ........... B64D 15/12; B64D 15/20; B60J 10/60
See application file for complete search history.

(56) References Cited

U.S. PATENT DOCUMENTS 6,266,925 B1 *   7/2001   Camerer .................. B60J 10/00
                                                    49/475.1
7,775,481 B2     8/2010   Jopp
(Continued)

FOREIGN PATENT DOCUMENTS

DE          19942038       10/2000
EP          0516526        12/1992
(Continued)

*Primary Examiner* — Brian M O'Hara
(74) *Attorney, Agent, or Firm* — Defillo & Associates, Inc.; Evelyn A. Defillo

(57) ABSTRACT

The invention aims to make aircraft doors easier to open by preventing ice formation or, at the very least, favoring rapid breaking of the ice on the door edges connected to the skin of the fuselage. To that end, it is provided to supply energy along the door when specific conditions are met. According to one embodiment, an anti-icing/de-icing system for an aircraft door (1) according to the invention includes an excitation energy source and devices (81 to 83) for dissipating such energy extending parallel to a side surface (11) of the aircraft door (1), along a sealing gasket (4) support (5) secured to the door (1) across from a fuselage (2) side surface (21) framing (20) the door (1). The sealing gasket (4) of the door (1) is compressed against bearing (6) from a side surface (25) of the fuselage (2) when the door (1) is closed.

16 Claims, 3 Drawing Sheets

(51) Int. Cl.
*F16J 15/06* (2006.01)
*B64D 15/04* (2006.01)

(56) References Cited

U.S. PATENT DOCUMENTS 7,900,870 B2    3/2011  Kyle
9,038,363 B2 *  5/2015  Pereira .................. B64D 15/12
                                                244/134 D

FOREIGN PATENT DOCUMENTS

EP       1541467        6/2005
EP       3031645   A1 * 6/2016   .............. B60J 10/60

* cited by examiner

ANTI-ICING / DE-ICING SYSTEM FOR AIRCRAFT DOOR AND AIRCRAFT DOOR EQUIPPED WITH SUCH A SYSTEM

CROSS REFERENCE TO RELATED APPLICATION

This application is a national stage entry of PCT/EP2014/062486 filed Jun. 14, 2014, under the International Convention claiming priority over French Patent Application No. 1355589 filed Jun. 14, 2013.

TECHNICAL FIELD

The invention relates to an anti-icing/de-icing method and system for an aircraft door, and an aircraft door which is provided with this system. The invention generally allows the door to be protected against frost or ice, whether this be in order to prevent the formation thereof or to cause it to disappear.

The prevention of the formation of ice or frost of an aircraft door allows the door to be opened in a standard manner not only in the case of landings in locations, or during specific periods of the year, where the temperature is low, for example, from −10 to −20° C., but also in the case of an emergency landing, the aircraft remaining covered with frost. The most common application remains the rejected take-off (RTO), for example, if a freezing rain is deposited on the fuselage while the aircraft is at the end of the runway (stopped and ready to take off).

The invention is used to prevent the formation of ice or to facilitate the breaking of the ice in the event that the formation has not been able to be prevented. In the whole of the present text, the use of the term "ice" is also intended to be understood to include frost, which results from the conversion of liquid water into a fine layer of ice.

The door openings of an aircraft which are not assisted become troublesome when a layer of ice covers the door, or the outer handle at least partially (when it is not able to be disengaged in relation to the inner handle), or the ventilation panels (vent panels) which are used in terms of security to prevent the pressurization of the equipment if the door is not completely locked.

The door opening mechanism comprises a lever arm which is capable of lifting the door before it is pivoted and of breaking the ice by means of shearing with a small component of flexion during this lifting action. The lifting mechanism has such dimensions as to comply with aircraft certification which imposes easy breaking of a layer of ice which may be up to 2 or 3 mm, or even more. Those dimensions of the opening mechanisms also require reinforcements so that those mechanisms are sufficiently robust to bring about great efforts on the edges of the door.

BACKGROUND OF THE INVENTION

Those dimensions and those reinforcements make the door heavy and generate high development costs.

Alternative solutions have been developed. For example, the patent document U.S. Pat. No. 7,900,870 provides for the use of two opening levers for an aircraft door, the second lever allowing the adhesive effect of the door, brought about by the presence of ice or another obstruction, to be overcome. That two-lever system remains complex and expensive.

In the patent document U.S. Pat. No. 7,775,481, it appeared necessary to prevent frosting of the locking elements of the doors and the evacuation slides. During deployment of the slides, the locking elements are secured in plates which are integrated in the floor of the aircraft cabin. Those locking elements are then heated by a heating plate which is integrated in a ceramic plate which is arranged in a hermetic manner at the bottom of each plate. The heating plate is constituted by a strip of alloy which extends in a zigzag manner in a layer of ceramic material in order to form a circuit whose ends are connected to electrical conductors.

The solution proposed in the U.S. Pat. No. 7,775,481 does not ensure effective anti-icing or de-icing of the door itself. This is because the heating means provided cannot prevent the formation of ice on the door and fuselage of the aircraft, and the de-icing of the slide deploying elements which are integrated in the floor of the aircraft remains ineffective in order to make it easier to open the door which is covered with ice along the edges thereof.

SUMMARY OF THE INVENTION

An object of the invention is specifically to facilitate the opening of the aircraft doors while preventing the formation or, at the very least, promoting the rapid breaking of the ice at the door edges in connection with the skin of the fuselage. To this end, there is provision for the introduction of energy along the door when specific conditions are combined.

To this end, the present invention relates to an anti-icing/de-icing method for a piece of aircraft equipment having an opening which is directed toward the outer side of the aircraft and which is surrounded by the fuselage via a sealing joint in the closed position, in particular an aircraft door, an outer door handle or a vent panel. This method involves dissipating an excitation energy along at least one extent which at least partially follows the joint of the opening of the piece of equipment, the dissipation being started when the engines of the aircraft are in operation and the external temperature is less than or substantially equal to a reference temperature. The extent of the dissipation of energy may be located in the joint, in the support of the joint, which may form the same piece with the joint, or in the region of the joint, on the equipment or on the fuselage surrounding the equipment.

According to preferred embodiments:
the excitation energy is dissipated at a door edge, in particular along at least one lateral face of the door, and/or along a lateral face of the fuselage parallel with the edge of a door;
the excitation energy is selected from thermal energy, vibration energy, electro-expulsive energy and pneumatic energy;
the thermal energy is implemented by an electric current;
the pneumatic energy is implemented by a current of pressurized hot air.

The invention also relates to an anti-icing/de-icing system for a piece of equipment, in particular a door, an outer door handle or a vent panel, of an aircraft, comprising in particular engines and a central control unit, this system being capable of carrying out the method above. Such a system comprises a source of excitation energy, a control processor which receives pieces of information involving temperature and pieces of information involving the operation of the engines from the central control unit, and dissipation means for such energy are capable of extending parallel with at least a portion of a sealing joint of the piece of equipment.

When the piece of equipment is an aircraft door, the dissipation means are capable of extending parallel with at least one lateral face of the aircraft door, along a support wall of a sealing joint which is fixedly joined to the door facing a lateral face of the fuselage of a frame of the door and/or along this lateral face of the fuselage, the sealing joint of the door being capable of being compressed against an abutment which is from a lateral face of the fuselage when the door is closed.

This system allows a reduction of the opening efforts and the opening time of the door in an emergency or standard situation, while limiting or eliminating the ice present—or at least by facilitating the breaking thereof—in the rebate zone between the lateral faces. The increase in effort allows a reduction in the dimensions of the door opening mechanisms, allows them to be made lighter and therefore allows the cost to be reduced.

According to specific embodiments:

the dissipation means of the excitation energy are constituted by at least one insulated electrical conductor which extends along the support wall of the sealing joint and the source of excitation energy is a source of electric voltage which transmits a current having an intensity which is suitable for heating the conductor to a temperature which does not exceed a predetermined upper value, in order to prevent any risk of being burnt by contact with the surrounding walls;

the support of the sealing joint is produced from a material which is selected from a material having epoxy carbon fibers, composite fibers, fibers based on silicone and elastomer materials, and the conductor is formed by a filament of metal alloy which is received within a sheath of electrically insulating material, the conductor being fixedly joined at least partially to or in the support;

the dissipation means of the excitation energy are constituted by ultrasound transmitters and the energy source is an ultrasound source;

the dissipation means of the excitation energy are constituted by dissipation loops of an electro-repulsive energy which is produced by a source of electrical pulses;

the dissipation means of the excitation energy are constituted by a jet of pressurized hot air which is supplied by a preheated air compressor as an energy source;

in order to further facilitate the breaking or detachment of the ice formed at the door/fuselage junction, anti-adhesive layers are also deposited on the skin of the door and the fuselage in the region of the frame of the junction between the door and the fuselage, in particular a nano-coating which is chemically connected to the skins and/or a strip of electricity conducting paint which is connected to a voltage source.

The invention also relates to an aircraft door which is provided with the anti-icing/de-icing system which is defined above, and an aircraft which is provided with an anti-icing/de-icing system of the type defined above, the term "of the type" being intended to be understood here to mean that the system is no longer dedicated exclusively to the door but, mutatis mutandis, to another piece of equipment which is provided with at least one joint. The system is then arranged in the region of at least one joint of a piece of equipment of the aircraft selected from the doors, the outer door handles and the vent panels.

BRIEF DESCRIPTION OF THE DRAWINGS

Other aspects and specific features of the implementation of the invention will be appreciated from a reading of the following detailed description which is accompanied by appended drawings which illustrate, respectively.

DETAILED DESCRIPTION OF THE INVENTION

In the present text, the qualifying term of the type "lateral" is intended to mean in extension perpendicularly relative to the center plane of the aircraft, and the qualifying terms of the type "upper", "vertical" or "horizontal" refer to the positioning of elements in the standard mode of use.

The aircraft is provided with a central control unit for the engines and accessories in conjunction with a control processor which receives pieces of information involving temperature and operation of the engines from the central control unit. The aircraft is constructed around a fuselage, in which access doors and evacuation doors are arranged.

Figure 1:
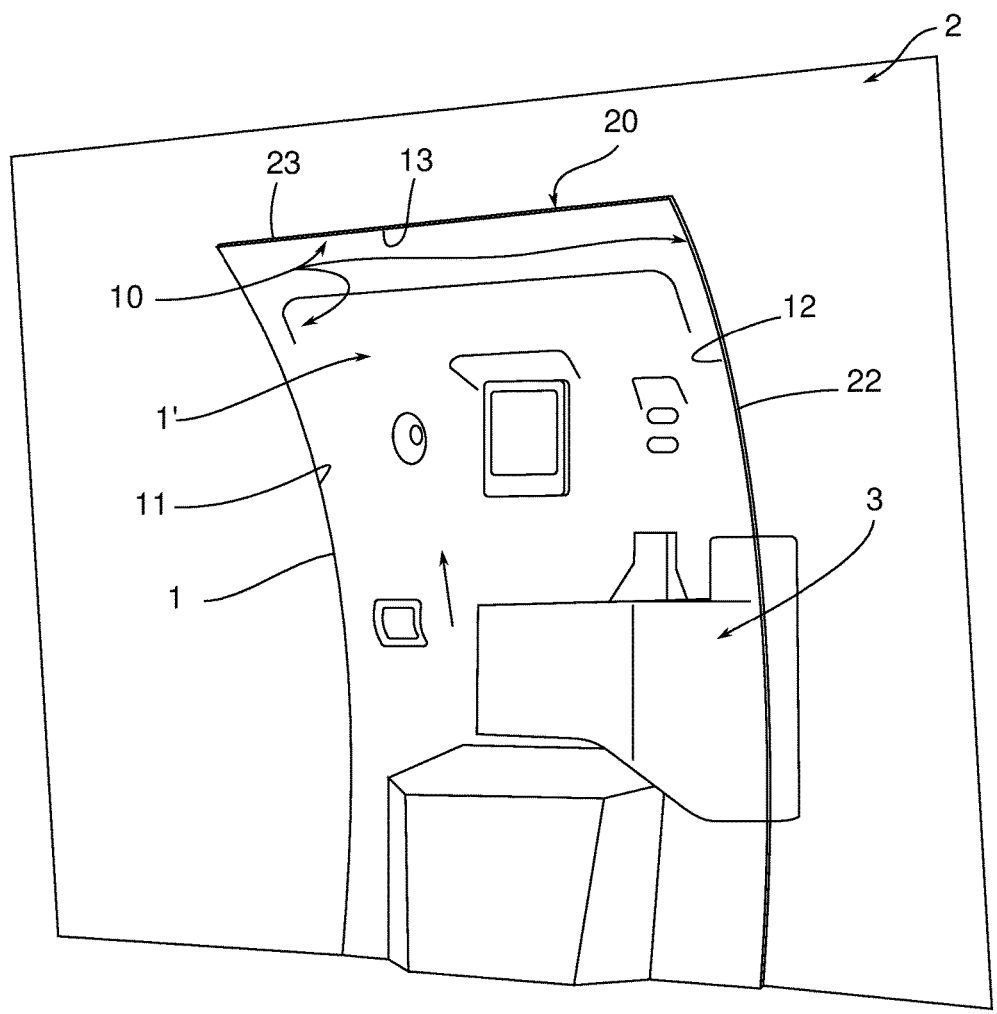
FIG. 1 is a general view of the internal face of an aircraft door which is surrounded by the fuselage in a closed position.

With reference to the general view of FIG. 1, the inner face 1$i$ of an aircraft door 1 is illustrated in the closed position and surrounded by the fuselage 2. The door 1 has an articulation arm 3 which is capable of pivoting the door 1, during the opening thereof, parallel with itself along the outer skin of the fuselage 2, in order to open a passenger evacuation space which is limited by the frame which is produced by a cutout 20 of the fuselage 2.

That frame comprises three substantially linear faces, two lateral faces 21 and 22 which are substantially vertical and which are connected by an upper face 23 which is substantially horizontal. The frame cutout 20 is produced facing an edge 10 of the door 1, also having two substantially vertical faces 11 and 12 which are connected by a substantially horizontal face 13.

According to the invention, the door 1 is provided with an anti-icing/de-icing system comprising a source of excitation energy which is controlled by the processor and dissipation means of such energy extending parallel with the edge 10 of the aircraft door 1.

Figure 2:
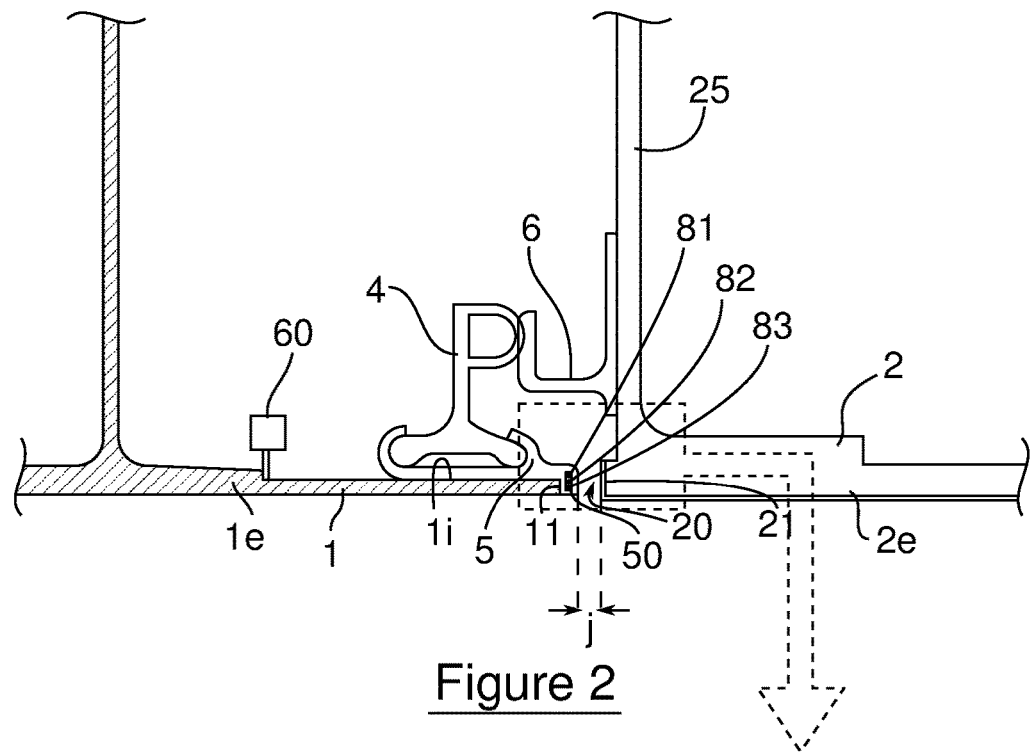
FIGS. 2 and 2a are a cross-section of the door/fuselage junction and an enlarged view in an embodiment according to the invention.

A sectioned view of the junction "J" between the face 11 of the door 1 and the frame face 21 of the fuselage 2 is illustrated with reference to FIG. 2, in accordance with an embodiment of the invention. In this view, a sealing joint 4 which is retained in a support 5 which is fixedly joined to the door 1, is pressurized against an abutment 6 which is formed on a lateral face 25 of the fuselage 2 when the door 1 is closed. In the example, the support 5 and the sealing joint 4 are produced from the same molding operation and form a single piece. The support 5 extends along the inner face 1$i$ of the door 1 and on the lateral face 11 of the door 1 by means of a so-called protection rim 50.

This is because that rim 50 protects the door against erosion, in particular when it is constituted by composite material based on carbon fibers, the erosion coming from the aerodynamic fluxes during flight. It also protects the door against impacts, for example, repeated impacts from the luggage of passengers.

In this example, the support 5 is produced from composite fibers and the source of excitation energy is a source of electric voltage such as the source 60 which transmits a current having an intensity between the ends of three electrical conductor filaments 61, 62, 63. The intensity of the electric current is calibrated so that the temperature of the surrounding walls does not exceed a given upper limit, for example, 60° C., in order to prevent any risk of a passenger or an operator being burnt as a result of contact with one of those walls.

Figure 2A:
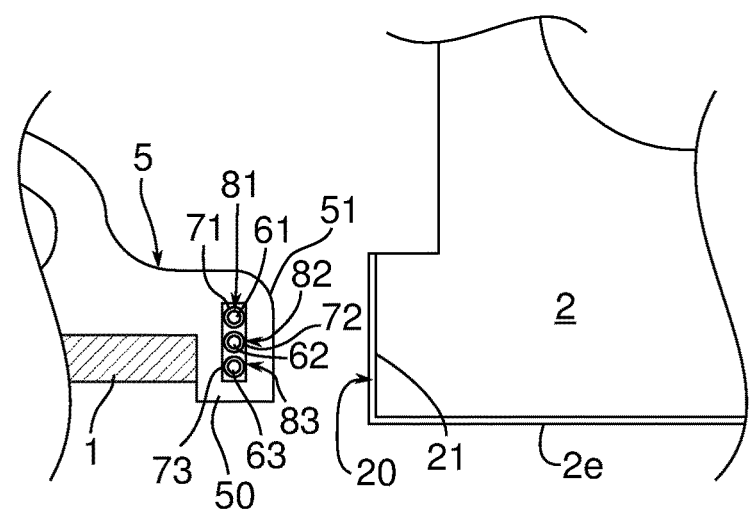

The filaments 61 to 63 are produced from metal alloy and are received in sheaths 71 to 73 of plastics material in order to form insulated conductors 81 to 83 (see the enlarged view of FIG. 2a). Those conductors are integrated in the rim 50 of the support 5 and extend parallel with the lateral face 51 of the support 5 which moves against the face 11 of the door 1. The lateral door 51 is opposite the lateral wall 21 of the frame of the fuselage 2. Under those conditions, the ice formed between the outer skins 2e and 1e of the fuselage 2 and the door 1, respectively with regard to the rebate zone between the lateral faces 11 and 21 of the junction "J" disappears or at least is reduced as a result of dissipation of the heat released by the heated filaments 61 to 63.

Figure 3:
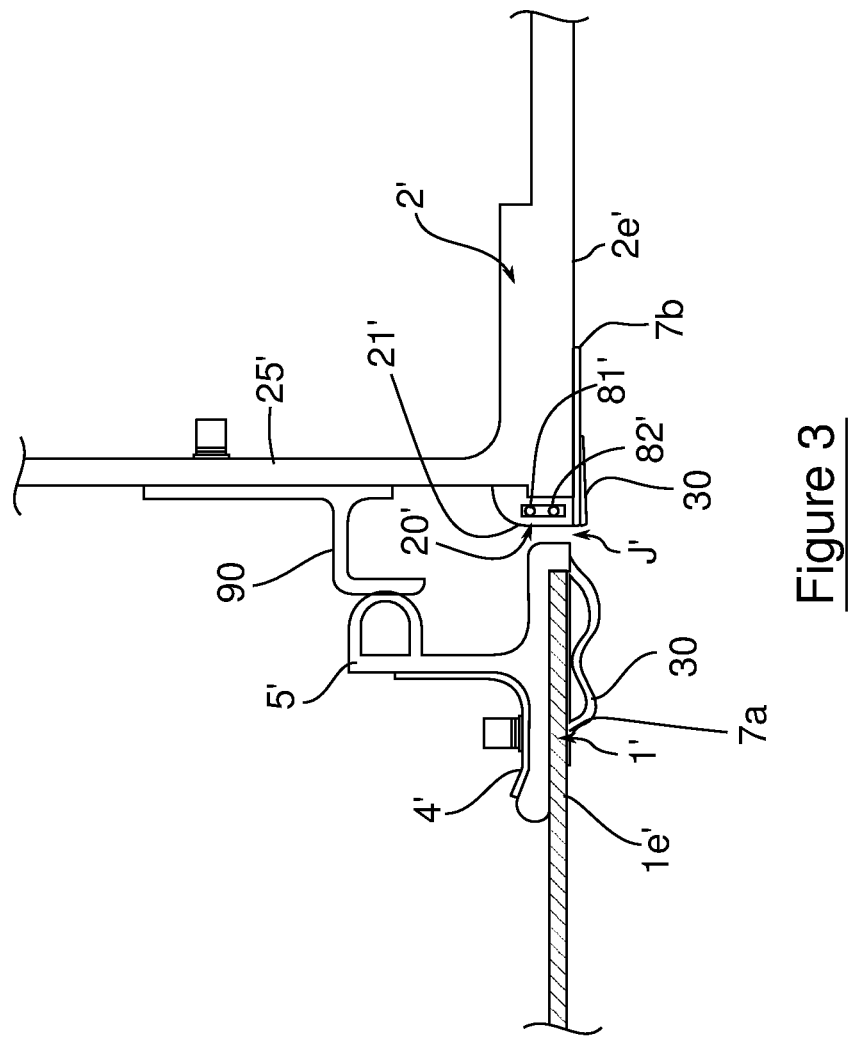
FIG. 3 is a longitudinal section of this junction in a construction variant.

The sectioned view of the junction "J" between the door 1' and the fuselage 2' of FIG. 3 illustrates a construction variant. In this variant, two thermal dissipation conductors 81' and 82' which are similar to the conductors 81 and 82 are integrated in the frame 20' of the fuselage 2' parallel with the lateral face 21' of this fuselage 2'. The support 5' of the joint 4' has a thickness which is sufficient to receive therein the conductors 81' and 82'. The joint 4' is deformed under pressure under the action of a blade 90 which comes from a lateral face 25' of the fuselage 2' in order to ensure the tightness of the door/fuselage connection.

In this variant, two nano-coating pieces 7a and 7b which form anti-adhesive layers are also chemically connected to the outer skins 1e' and 2e', respectively, of the door 1' and the fuselage 2'. The pieces 7a and 7b are arranged in the region of the junction J'. The presence of those coatings allows the breaking or the detachment of the ice 30 formed on the outer skins 1e' and 2e' to be further made easier. Alternatively, a strip of electricity conducting paint may be deposited on the outer skins 1e' and 2e', in the region of the junction J'. The ends of such a strip are connected to the terminals of a voltage source such as the source 60 (FIG. 2).

During operation, the processor can start the system by placing the filaments under voltage when the temperature data fall below a reference value, 10° C. in the examples illustrated. The reference value may be approximately from 10° to 15° but could be greater than 15° or less than 10° in accordance with the climatic conditions or the type of airline served.

The invention is not limited to the embodiments described and illustrated. In particular, the thermal energy may be dissipated by an exothermic reaction between chemical components or by the combustion of a slow fuel. Furthermore, a de-icing solution in general, based on alcohol is also vaporized along at least one edge of a door.

Furthermore, the aircraft may equally well be on the ground or in flight.

Furthermore, the invention may also be applied in a similar manner to the joint of the outer handle of an aircraft door or to the joints of the vent panels.

The invention claimed is:

1. An anti-icing and/or de-icing method for an aircraft door (1, 1'), the aircraft door having a closed position wherein the aircraft door is surrounded by a fuselage (2, 2') of an aircraft and, wherein a sealing joint (4, 4') is located at a junction (J, J') between the aircraft door and the fuselage, the method comprising the steps of:
    releasing an excitation energy along at least one support (5, 21') which at least partially follows and retains the sealing joint (4, 4') in the junction and
    starting the releasing of the excitation energy when a control processor receives information that engines of the aircraft are in operation and an external temperature is less than or substantially equal to a reference temperature.

2. The method as claimed in claim 1, wherein the excitation energy is released at a door edge (10) along at least one lateral face (11, 12, 13) of the aircraft door (1, 1'), and/or along a lateral face (21, 22, 23, 25) of the fuselage (2, 2') parallel with the door edge (10).

3. The method as claimed in claim 2, wherein the excitation energy is selected from the group consisting of a thermal energy, a vibration energy, an electro-expulsive energy, and a pneumatic energy.

4. The method as claimed in claim 3, wherein the thermal energy is implemented by an electric current.

5. The method as claimed in claim 3, wherein the pneumatic energy is implemented by a current of pressurized hot air.

6. The method as claimed in claim 1, wherein an anti-icing solution is vaporized along a door edge of the aircraft door.

7. An anti-icing and/or de-icing system for an aircraft door (1, 1') of an aircraft, the aircraft provided with engines, a fuselage and a central control unit, the system comprising:
    a control processor connected to the central control unit to receive pieces of information involving temperature and pieces of information involving the operation of the engines,
    a sealing joint (4, 4') located at a junction (J, J') between the aircraft door and the fuselage,
    a source of excitation energy, and
    excitation energy conductors (81 to 83; 81', 82') extending parallel with at least a portion of the sealing joint (4, 4') to release excitation energy at the junction,
    wherein the control processor controls the system to release excitation energy based on the pieces of information involving temperature and the pieces of information involving the operation of the engines.

8. The system as claimed in claim 7, wherein the aircraft door (1, 1'), excitation energy conductors extend parallel with at least one lateral face (11, 12, 13) of the aircraft door (1, 1'),
    along a support (5, 5') of the sealing joint (4, 4') which is fixedly joined to the door (1, 1') facing a lateral face (21, 22, 23; 21') of the fuselage (2, 2') of a frame (20, 20') of the door (1, 1') and/or along a lateral face (21, 22, 23; 21') of the fuselage (2, 2'), and
    the sealing joint (4, 4') of the door (1, 1') becoming compressed against an abutment (6, 90) formed on a lateral face (25, 25') of the fuselage (2, 2').

9. The system as claimed in claim 7, wherein the excitation energy conductors are comprised of at least one insulated electrical conductor (81 to 83; 81', 82') which extends along a support (5, 5') of the sealing joint (4, 4'), and/or along a lateral fuselage face (21'), and
    the source of excitation energy is a source of electric voltage which transmits a current having an intensity which is suitable for heating the excitation energy conductors to a temperature which does not exceed a predetermined upper value.

10. The system as claimed in claim 8, wherein
    the support (5, 5') of the sealing joint (4, 4') is produced from a material which is selected from a material having epoxy carbon fibers, composite fibers, and fibers based on silicone and elastomer materials, and the excitation energy conductors are (81 to 83; 81', 82') formed by a filament (61 to 63) of metal alloy which is received within a sheath of electrically insulating material (71 to 73), the excitation energy conductors (81 to 83; 81', 82') being fixedly joined at least partially to or in the support (5, 5').

11. The system as claimed in claim 7, wherein the excitation energy conductors are constituted by ultrasound transmitters and the energy source is an ultrasound source.

12. The system as claimed in claim 7, wherein the excitation energy conductors are constituted by dissipation loops of an electro-repulsive energy which is produced by a source of electrical pulses.

13. The system as claimed in claim 7, wherein the source of excitation energy is constituted by a jet of pressurized hot air which is supplied by a preheated air compressor as an energy source.

14. The system as claimed in claim 7, wherein anti-adhesive layers are deposited on a skin of the door (1*e'*) and a skin (2*e'*) of the fuselage in a region of the junction (J, J') between the door (1, 1') and the fuselage (2, 2'),
wherein the anti-adhesive layers are nano-coatings (7*a*, 7*b*) which are chemically connected to the skins (1*e'*, 2*e'*) and/or a strip of electricity conducting paint which is connected to a voltage source (60).

15. The system as claimed in claim 9, wherein the at least one insulated electrical conductor extends in a protection rim of the support.

16. The system as claimed in claim 7, where the excitation energy conductors are further arranged in a region of at least one joint of a piece of equipment of the aircraft selected from passenger doors, outer door handles and vent panels.

\* \* \* \* \*